(12) United States Patent
Mietke et al.

(10) Patent No.: US 12,468,526 B2
(45) Date of Patent: Nov. 11, 2025

(54) REALISTIC PERFORMANCE ANALYSIS FOR PLANNED CHANGES

(71) Applicant: SAP SE, Walldorf (DE)

(72) Inventors: Sebastian Mietke, Reilingen (DE); David Bischof, Wiesloch (DE)

(73) Assignee: SAP SE, Walldorf (DE)

( * ) Notice: Subject to any disclaimer, the term of this patent is extended or adjusted under 35 U.S.C. 154(b) by 187 days.

(21) Appl. No.: 18/530,007

(22) Filed: Dec. 5, 2023

(65) Prior Publication Data

US 2025/0181340 A1    Jun. 5, 2025

(51) Int. Cl.

| | |
|---|---|
| *G06F 11/36* | (2025.01) |
| *G06F 8/30* | (2018.01) |
| *G06F 8/60* | (2018.01) |
| *G06F 8/65* | (2018.01) |
| *G06F 9/455* | (2018.01) |
| *G06F 11/34* | (2006.01) |
| *G06F 11/3668* | (2025.01) |
| *H04L 29/08* | (2006.01) |

(52) U.S. Cl.
CPC .............. *G06F 8/65* (2013.01); *G06F 8/30* (2013.01); *G06F 11/3466* (2013.01); *G06F 11/3692* (2013.01)

(58) Field of Classification Search
CPC .......... G06F 8/65; G06F 8/30; G06F 11/3466; G06F 11/3692; G06F 11/3495; G06F 11/3696; G06F 11/3698; G06F 11/3414; G06F 11/3433; G06F 11/3419; G06F 11/3688; G06F 9/5027
See application file for complete search history.

(56) References Cited

U.S. PATENT DOCUMENTS

| | | | |
|---|---|---|---|
| 8,990,778 B1 * | 3/2015 | Allocca | G06F 11/3461 717/126 |
| 10,102,114 B1 * | 10/2018 | Jing | G06F 11/3688 |

* cited by examiner

*Primary Examiner* — Thuy Dao
(74) *Attorney, Agent, or Firm* — Fountainhead Law Group, PC (57) ABSTRACT

To conduct realistic performance analysis for planned software changes, code changes are obtained for an application, including a change to a data source. Then a test version of the application and test information are provided to a separate production system running a current version of the application. The test version includes the code changes and the test information includes a request to test the data source. Later, test results are received from the production system. The test results compare performance of the data source in the current version of the software application to performance of the data source in the test version of the software application. The test results are obtained by supervising the data source, recording how the data source was accessed during operation of the production system, and testing performance in test version in a same manner as it was accessed during the operation.

20 Claims, 6 Drawing Sheets

REALISTIC PERFORMANCE ANALYSIS FOR PLANNED CHANGES

BACKGROUND

The present disclosure relates to computer software performance analysis and in particular to realistic performance analysis for planned software changes.

Software products are designed to fulfill various product standards. One of these product standards is performance. The response time of the software system is of special interest in general if an end-user is involved (e.g., user interface (UI) processes, etc.). Performance issues in some software products are caused by too complex data models for data sources (e.g., core data services (CDS) views and other data sources). The performance of these objects can be tested automatically in dedicated test systems. In some cases, different key performance indicators (KPIs) are considered based on different performance expectation classifications of the data models. If these KPIs are not met, the testing software may issue notifications indicating that the performance is inacceptable.

Unfortunately, the results of the automated performance tests (and manual tests) are strongly dependent on the test data. For instance, the runtime depends on the data load during the test, but also on the structure of the test data. Herein, the "structure" of the data refers to how the data is distributed considering the underlying data model. In other words, the structure reflects patterns of information extracted from the test data. For example, the same data model used by different computer systems of different organizations may have different structures due to the different types and ways of information being stored by those organizations.

Especially for complex data models, the runtime of the data retrieval (e.g., through a CDS view stack) in the performance test can strongly differ from the actual runtime in a production system (e.g., as implemented by a customer of a software manufacturer). The total amount of underlying data can be different as well as the data structure. Therefore, it is crucial to have realistic test data in the internal test system.

Far too often this is not the case. The amount of data as well as its structure might be unknown, since it is not provided by the end users or customers (e.g., for legal reasons or data privacy reasons). The situation gets even worse, if the test data is only created to pass the developer's test check. Consequently, the quality of the performance test data is often bad and performance issues are reported frequently (e.g., by customers).

These issues in obtaining realistic test data cannot necessarily be solved by improved developer-side testing checks. It may not be possible to check the quality of the performance test data if information about the data in production end user/customer systems is missing.

Additionally, the customer's hardware configuration might be different or less efficient than the testing hardware configuration. Furthermore, even if the test data would have a good quality, border cases might exist, which are acceptable in the internal performance system but not in the production customer system.

The present disclosure addresses these issue and others, as further described below.

SUMMARY

Some embodiments provide a computer system, comprising one or more processors and one or more machine-readable medium coupled to the one or more processors. The one or more machine-readable medium storing computer program code comprising sets of instructions. The set of instructions executable by the one or more processors to obtain one or more code changes for a software application, the one or more changes including a change to a data source, a current version of the software application being run on a separate production system. The set of instructions executable by the one or more processors to provide, to the production system, a test version of the software application and test information, the test version including the one or more code change, the test information including a request to test the data source. The set of instructions executable by the one or more processors to receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The set of instructions executable by the one or more processors to adjust the one or more code changes based on the test results and performance indicators to obtain a new version of the software application. The set of instructions executable by the one or more processors to deploy the new version of the software application to the production system, the new version of the software application meeting the performance indicators.

Some embodiments provide a non-transitory computer-readable medium storing computer program code. The computer program code comprising sets of instructions to obtain one or more code changes for a software application, the one or more changes including a change to a data source, a current version of the software application being run on a separate production system. The computer program code comprising sets of instructions to provide, to the production system, a test version of the software application and test information, the test version including the one or more code change, the test information including a request to test the data source. The computer program code comprising sets of instructions to receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The computer program code comprising sets of instructions to adjust the one or more code changes based on the test results and performance indicators to obtain a new version of the software application. The computer program code comprising sets of instructions to deploy the new version of the software application to the production system, the new version of the software application meeting the performance indicators.

Some embodiments provide a computer-implemented method. The method comprises obtaining one or more code changes for a software application, the one or more changes including a change to a data source, a current version of the software application being run on a separate production system. The method comprises providing, to the production system, a test version of the software application and test information, the test version including the one or more code change, the test information including a request to test the data source. The method comprises receiving, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The method comprises adjusting the one or more code changes based on the test results and performance indicators to obtain a new version of the software application. The method comprises deploying the new version of the software application to the production system, the new version of the software application meeting the performance indicators.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, the results of the automated performance tests (and manual tests) are strongly dependent on the test data. For instance, the runtime depends on the data load during the test, but also on the structure of the test data. Herein, the "structure" of the data refers to how the data is distributed considering the underlying data model. In other words, the structure reflects patterns of information extracted from the test data. For example, the same data model used by different computer systems of different organizations may have different structures due to the different types and ways of information being stored by those organizations.

Examples for patterns could be as follows:
If there is one entry in <DATABASE_TABLE_A>, there is an average of two entries with the same key in <DATABASE_TABLE_B>.
For each combination of <COLUMN_VALUE_1> and <COLUMN_VALUE_2> in <DATABASE_TABLE_A> three entries exist in <DATABASE_TABLE_C>.)

Especially for complex data models, the runtime of the data retrieval (e.g., through a CDS view stack) in the performance test can strongly differ from the actual runtime in a production system (e.g., as implemented by a customer of a software manufacturer). The total amount of underlying data can be different as well as the data structure. Therefore, it is crucial to have realistic test data in the internal test system.

Far too often this is not the case. The amount of data as well as its structure might be unknown, since it is not provided by the end users or customers (e.g., for legal reasons or data privacy reasons). The situation gets even worse, if the test data is only created to pass the developer's test check. Consequently, the quality of the performance test data is often bad and performance issues are reported frequently (e.g., by customers).

These issues in obtaining realistic test data cannot necessarily be solved by improved developer-side testing checks. It may not be possible to check the quality of the performance test data if information about the data in production end user/customer systems is missing.

Additionally, the customer's hardware configuration might be different or less efficient than the testing hardware configuration. Furthermore, even if the test data would have a good quality, border cases might exist, which are acceptable in the internal performance system but not in the production customer system.

The present disclosure provides techniques for realistic performance analysis of planned software changes to address these issues and others. An overview of these techniques is provided upfront with further details below.

To conduct realistic performance analysis of planned software changes, the corresponding new changed objects (e.g., data sources such as CDS views, etc.) can be provided as a test version to one or more end users or customer systems. If the object is a new object, automated performance tests can be delivered as well. This is also possible for changed objects. However, if the objects are changed only, a new mechanism is introduced to evaluate the performance of the new (i.e., test) version in comparison to the current/old (i.e., production) version. Hence, the new objects can be used the same way as their production versions. This means that the use of the objects in scope can be recorded (e.g., data access of a data source).

As an example, selection criteria and if required parameters are recorded at runtime, for changed performance critical CDS views. Afterwards, the changed CDS view can be automatically tested in terms of performance, comparing the production version with the test version. These automatic performance tests can be scheduled in dedicated timeframes when the customer system can provide free capacity (if the business workload allows it), for example. The results of the automated performance tests are then provided through an API, which can be accessed externally by the software manufacturer.

Features and advantages of these techniques are that the test data matches how the data is used in production, thereby avoiding discrepancies in test performance compared to actual performance. The test data matches because the use of the data at runtime is recorded and then the use is redone for both the production version and the test version of the object under test. Another feature and advantage of the disclosure techniques is that the end user/customer's data remains private since the tests are performed within the customer's system and only the results are provided to the software developer.

Furthermore, these techniques improve the overall performance of software systems. With this, realistic performance measurements are executed. Planned new objects and planned changes to existing objects can be adjusted, if required. The developer has the opportunity to adjust the objects before they get delivered to all customers for use in production environments. Therefore, less performance issues will be detected by customers.

Another advantage is that the customer is not required to provide realistic test data, which may have to be anonymized for legal reasons, etc. Furthermore, it is not needed to create complex test data manually by the developer. It also is not needed, to create complex generators to create suitable test data automatically. Instead, the performance tests are executed with real/production data on real customer hardware. Additionally, already existing objects are used the same way within the test and during the production usage. Thus, the results are realistic and accurate.

Figure 1:
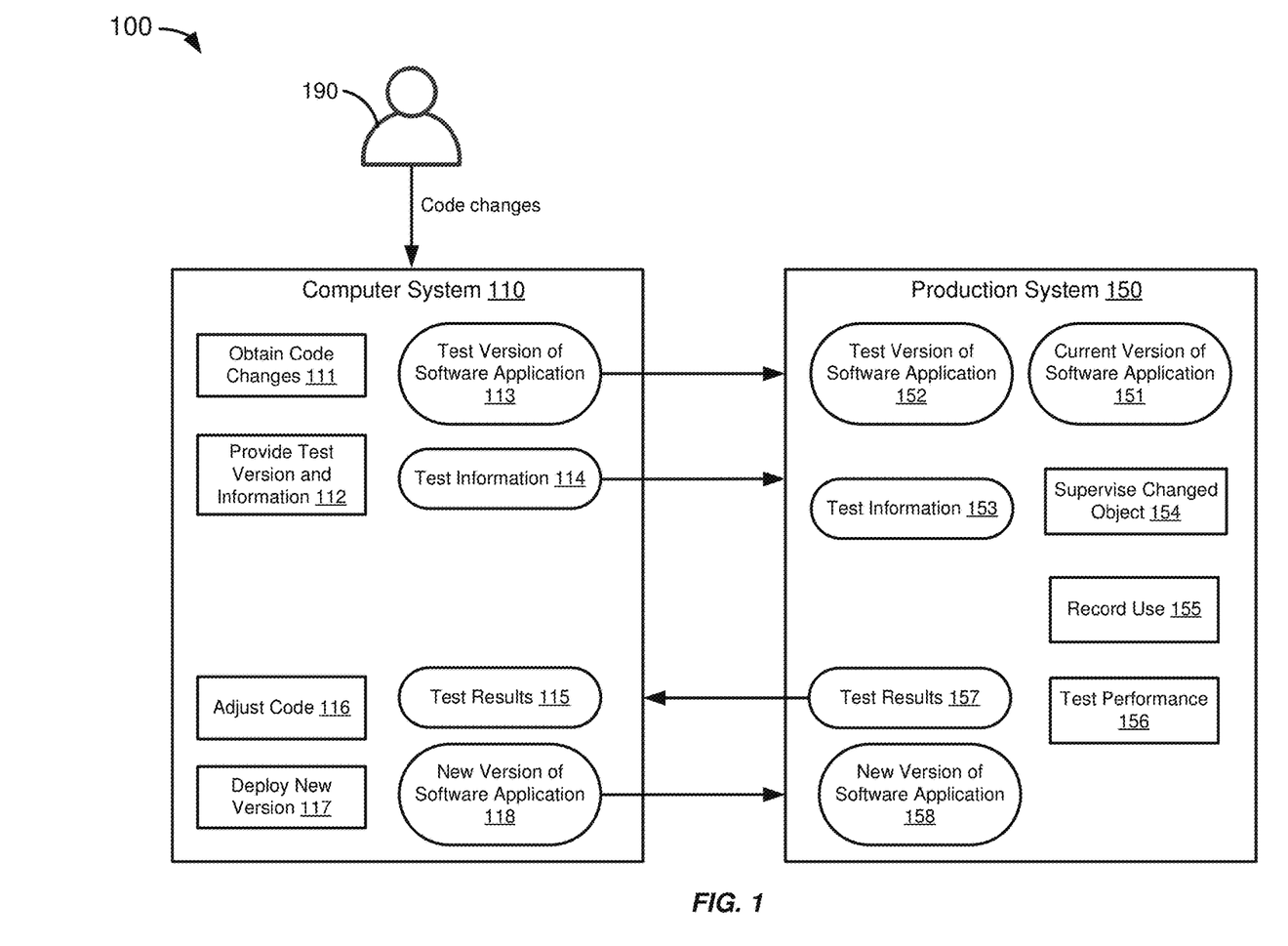
FIG. 1 shows a diagram of computer systems for realistic performance analysis of planned software changes, according to an embodiment.
Figure 2:
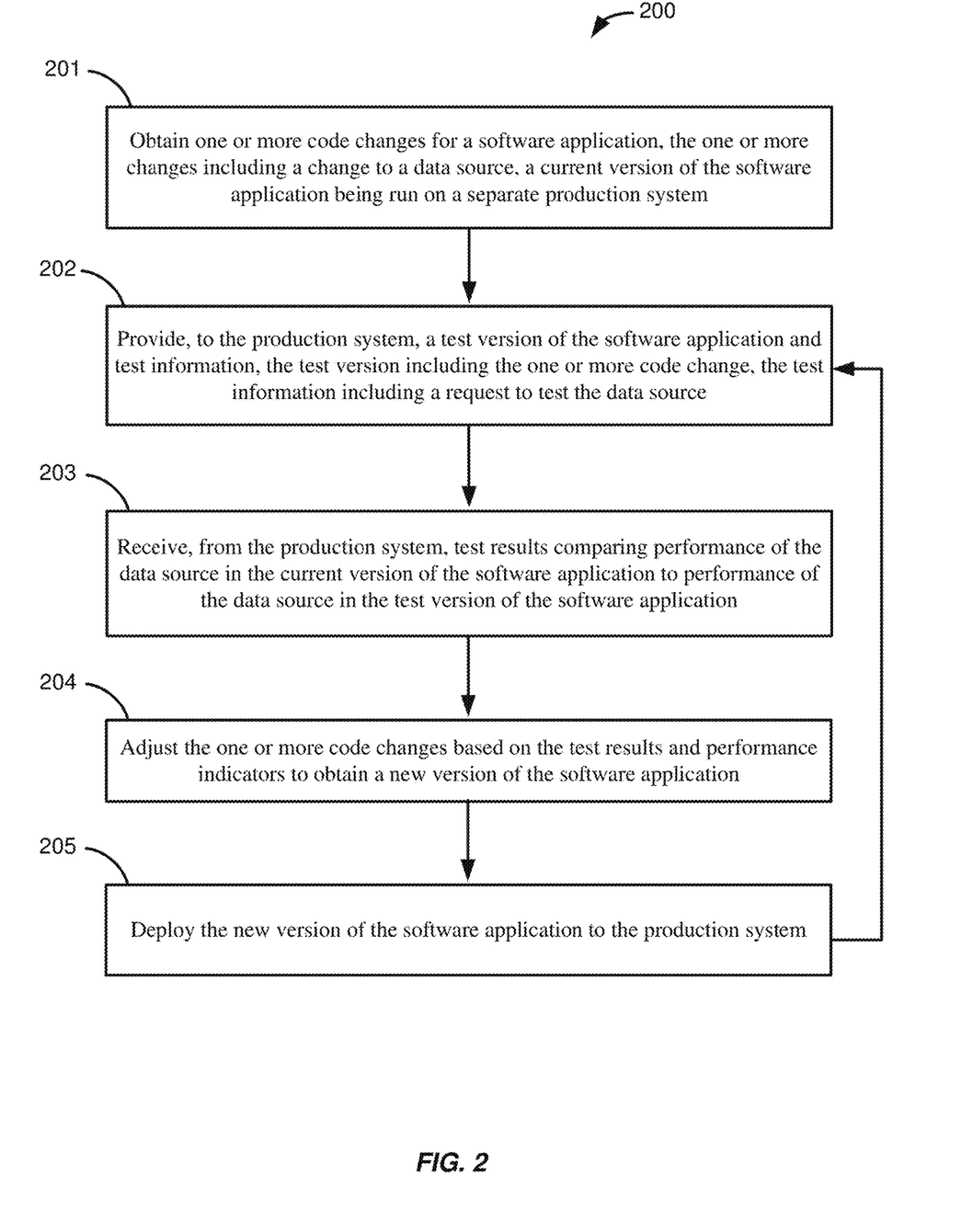
FIG. 2 shows a flowchart of a computer implemented method for realistic performance analysis for planned changes, according to an embodiment.
Figure 3:
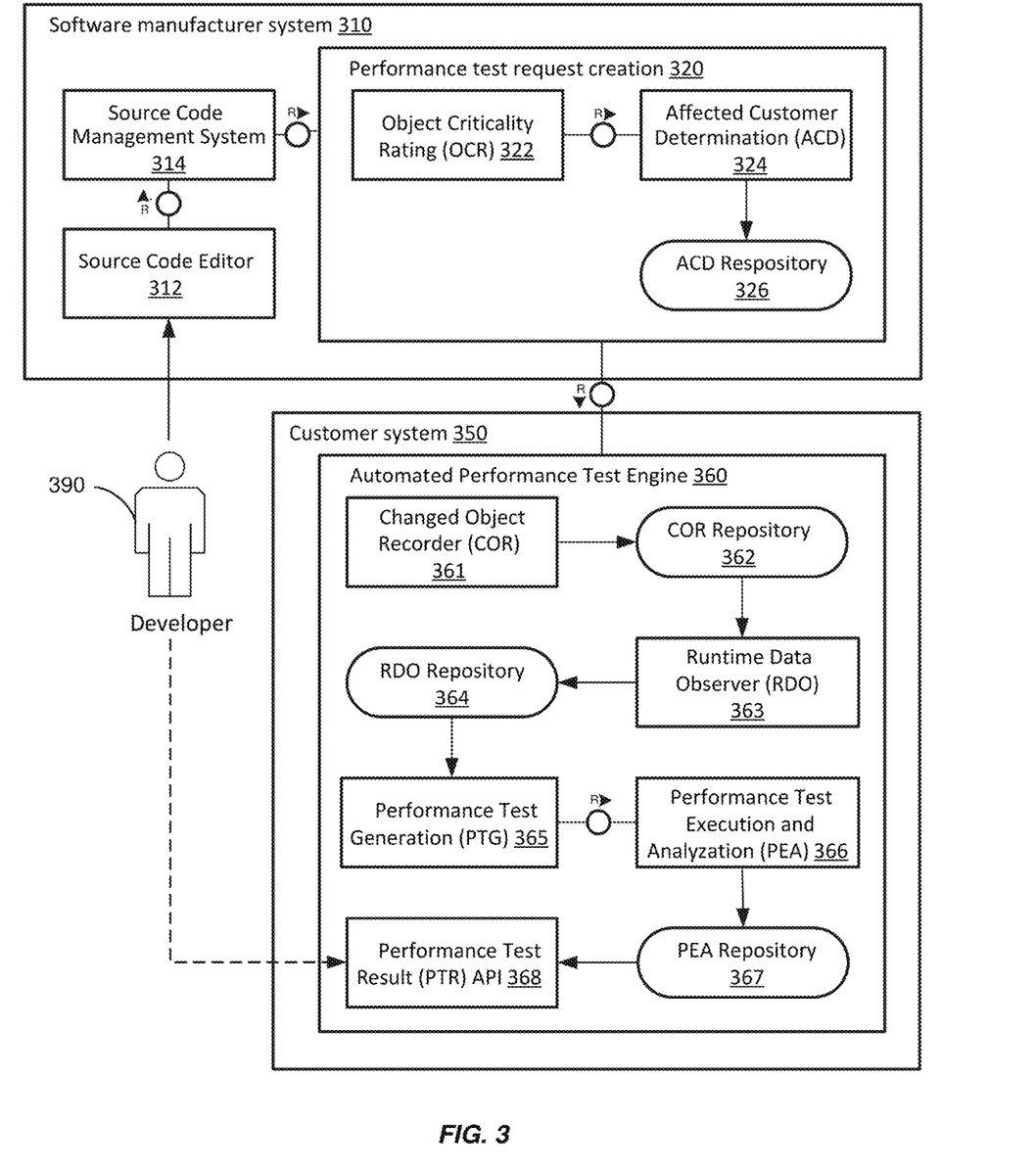
FIG. 3 shows a diagram of a software manufacturer system and a customer system, according to an embodiment.
Figure 4:
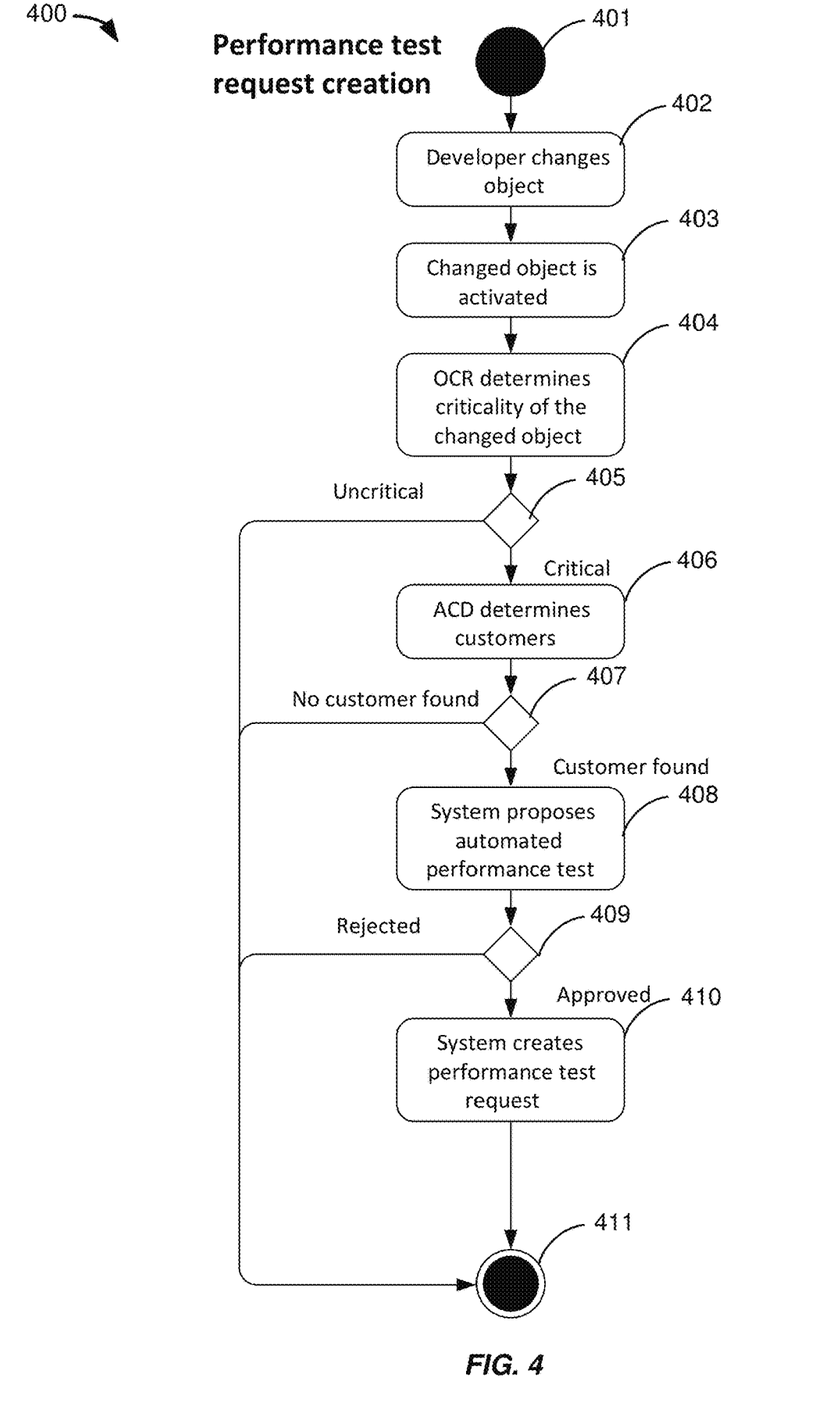
FIG. 4 shows a flowchart of performance test request creation, according to an embodiment.
Figure 5:
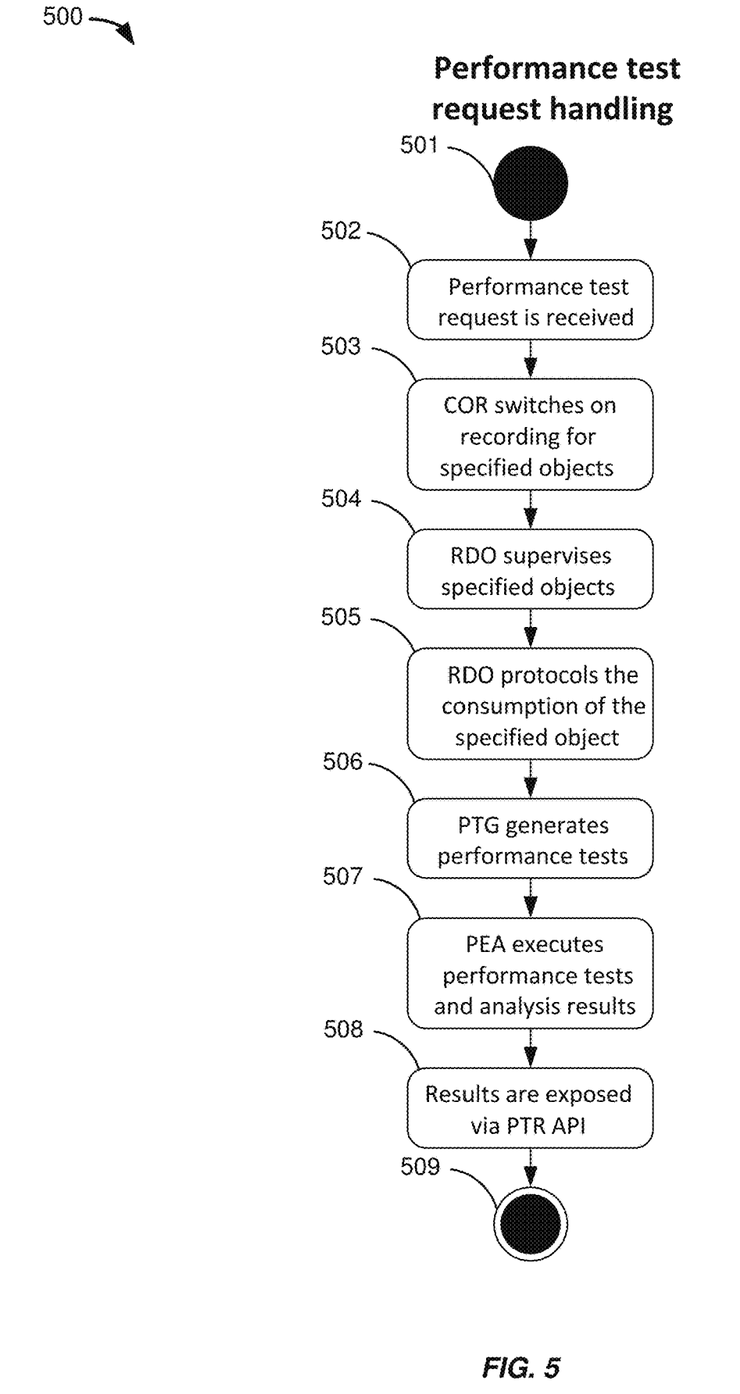
FIG. 5 shows a flowchart of performance test request handling, according to an embodiment.

The techniques for realistic performance analysis of planned software changes are expanded with further details with respect to FIG. 1 and FIG. 2 and then an example implementation is described with respect to FIGS. 3-5.

FIG. 1 shows a diagram 100 of computer systems for realistic performance analysis of planned software changes, according to an embodiment. A computer system 110 is a software development system of a software manufacturer used by a software developer 190. The developer 190 is developing a test version of a software application 113. The computer system 110 includes an obtain code changes software component 111, a provide test version and information software component 112, an adjust code software component 116, and a deploy new version software component 117.

A production system 150 is a computer system used by a customer of the software manufacturer. The production system runs a current version of a software application 151 in a production environment. The production system 150 includes a supervise changed object software component 154, a record use software component 155, and a test performance software component 156.

The obtain code changes component 111 is configured to obtain one or more code changes for a software application. These changes may be made by the developer 190. The one or more changes may include a change to a data source. As mentioned, a current version of the software application 151 may be running on a separate production system 150. In some embodiments, the data source is a core data services (CDS) view.

In some embodiments, the computer system 110 may also determine that the change to the data source is performance critical based on which fields and tables are being accessed and how many fields and tables are being accessed. In some embodiments, the computer system 110 may also determine that the production system 150 is affected by the change to the data source based on identification of application components deployed to the production system.

The provide test version and information component 112 may provide, to the production system, a test version of the software application 152 and test information 153. The test version 152 may include the one or more code change. The test information 153 may include a request to test the data source. In some embodiments, the test information further includes a specified timeframe or a specified number of calls to the data source to be recorded by the record use component 155.

The computer system 110 may receive, from the production system 150, test results 115. The test results 115 may compare performance of the data source in the current version of the software application 151 to performance of the data source in the test version of the software application 152.

The production system 150 may obtain the test results 157 by supervising the data source using the supervise changed object component 154. Then the record use component 155 may recording how the data source was accessed during operation of the production system. Then the test performance component 156 may test performance of the change to the data source in test version of the software application 152. The performance testing by the test performance component 156 may include accessing the test version data source in a same manner as it was accessed during the operation of the production system. As such, the tests are realistic and accurate for the production system.

In some embodiments, the recording, by the record use component 155, of how the data source were accessed during operation of the production system includes recording selection criteria.

In some embodiments, the reception, by the computer system 110, of the test results from the production system 150 includes making a request to an application programming interface of the production system 150.

The adjust code component 116 adjusts the one or more code changes based on the test results 115 and performance indicators to obtain a new version of the software application 118. For example, the developer 190 may modify code and the adjust code component 116 may adjust the one or more code changes according to the modifications input by the developer 190. This process may be an iterative process in which the developer makes adjustments, a new test version is sent to the production system 150, and then it repeats. The developer manually makes adjustments to the code by providing user input (e.g., typing) and then the adjust code component 116 implements these adjustments on the computer system 110.

The deploy new version component 117 may deploy the new version of the software application to the production system 150. The new version of the software application 158 may meet the performance indicators when executed on the production system 150.

Further details and examples of the techniques for realistic performance analysis of planned software changes are provided below.

FIG. 2 shows a flowchart 200 of a computer implemented method for realistic performance analysis for planned changes, according to an embodiment. The computer implemented method may be implemented by a computer system such as the one described above with respect to FIG. 1. Such a computer system may be implemented using hardware as described below with respect to FIG. 6.

At 201, the method may obtain one or more code changes for a software application. The one or more changes may include a change to a data source. A current version of the software application may be running on a separate production system.

In some embodiments, the data source is a core data services (CDS) view.

In some embodiments, the method may determine that the change to the data source is performance critical based on which fields and tables are being accessed and how many fields and tables are being accessed.

In some embodiments, the method may determine that the production system is affected by the change to the data source based on identification of application components deployed to the production system.

At 202, the method may provide, to the production system, a test version of the software application and test information. The test version may include the one or more code change. The test information may include a request to test the data source.

In some embodiments, the test information further includes a specified timeframe or a specified number of calls to the data source to be recorded.

At 203, the method may receive, from the production system, test results comparing performance of the data source in the current version of the software application to performance of the data source in the test version of the software application. The test results may have been obtained by the production system supervising the data source, recording how the data source was accessed during operation of the production system, and testing performance of the change to the data source in test version of the software application. The performance testing may include accessing the test version data source in a same manner as it was accessed during the operation of the production system. As such, the tests are realistic and accurate for the production system. In addition, the productive version is measured. Both versions may be tested in the same timeframe such that the results are comparable.

In some embodiments, the recording of how the data source were accessed during operation of the production system includes recording selection criteria.

In some embodiments, the reception of the test results from the production system includes making a request to an application programming interface of the production system.

At 204, the method may adjust the one or more code changes based on the test results and performance indicators to obtain a new version of the software application. For example, a developer may modify code and a computer system may adjust the one or more code changes according to the modifications input by the developer.

At 205, the method may deploy the new version of the software application to the production system. The new version of the software application meeting the performance indicators. This process may be an iterative process that continues to 202 from 205 until the performance indicators are met.

Example

Techniques for performing realistic performance analysis for planned changes were described above. Further details with an example implementation of these techniques is now provided.

FIG. 3 shows a diagram 300 of a software manufacturer system 310 and a customer system 350, according to an embodiment. The software manufacturer system 310 may be implemented on one or more computer systems (e.g., server computers). The software manufacturer system 310 includes a source code editor 312, a source code management system 314, and a performance test request creation software component 320.

A software developer 390 uses the source code editor 312 to edit source for a software application that has been provided to the customers, and which is running on the customer system 350 (and potentially other customer systems). When the developer 390 changes the code, they can use the source code editor 312 to submit a request for the code changes to be accepted into the source code management system 314. The source code management system 314 may store the code changes into a repository, for example.

In some embodiments, the code changes can be changes to a data source (e.g., CDS views). In other examples the code changes can be to other object types such as routines, classes, or function modules.

When the source code management system 314 obtains a new code change it can send a request including information on the new code change to the performance test request creation component 320 based on the new code change. The information can include the code change itself as well as metadata on the code change, for example.

As an example, whenever a CDS view is created or changed by the developer 390, information about the CDS view can be provided to the performance test request creation component 320.

The performance test request creation component 320 includes an object criticality rating (OCR) component 322, an affected customer determination (ACD) component 324, and an ACD repository 326.

When information on the new code change is received by the performance test request creation component 320, the object criticality rating (OCR) component 322 determines if the new code change (e.g., new data source such as a CDS view) is relevant for the automated performance tests on customer side. As an example, a CDS view selecting three fields from a small customizing table may be assumed not to be performance critical. Therefore, it is rated as not considerable by the OCR 322. However, a CDS view selecting 100 fields from 50 tables involving huge application tables would be determined by the OCR component 322 to be critical such that it will be considered.

When it is determined that the new code change is performance critical, the affected customer determination (ACD) component 324 determines which customers are affected by the planned new code changes based on application components and other information. As an example, changes within a "Public Sector Management" application might be relevant for certain Public Sector customers.

Historic customer incidents might be considered by the ACD component 324 as well, to determine pilot customers, which can later be provided with the automated tests (e.g., they are provided with the test versions of changed data sources or other objects). As an example, there might be one or more customers which already reported performance issues in the past. The results are persisted in the ACD repository 326 for future determination processes.

With this, the software manufacturer system 310 can provide a recommendation to one or more customer systems, including the customer system 350, to perform automatic performance measurements for the objects in scope (i.e., the changed objects that are critical to performance and which are relevant to the customers). After confirmation (e.g., manually by the developer or automatically through a rule), a request is sent to the selected customer systems containing the planned changes.

The customer system 350 includes an automated performance test engine 360. The request with the planned changes is handled in the customer system 350, by the automated performance test engine 360. In a first step, it is checked, if the object already exists at the customer system 350. If so, a changed object recorder (COR) component 361 switches on a runtime analysis setting/configuration for the affected object(s). For example, this may involve setting a specified timeframe or a specified number of calls to the object to be recorded during runtime. This recording involves creating an entry in a COR repository 362, which is used by runtime data observer (RDO) component 363.

The RDO component 363 supervises objects from the COR repository 362 at runtime. It determines how the object is being used (e.g., the way in which a data source is being accessed for data source objects and how data is retrieved from the data source). Regarding data sources (such as CDS views), the corresponding selection criteria, etc. are determined by the RDO component 363. In some embodiments, the RDO component 363 stops supervising the objects if the provided recording time ends or if the number of calls to be recorded is reached. The results are persisted in an RDO repository 364.

Afterwards, a performance test generation (PTG) component 365 is triggered to create automated performance tests based on the results from the RDO repository 364. The PTG component 365 may generate tests based on templates which are enriched with the information from the RDO component 363. As an example, if the RDO component 363 detected SELECT-operations on a specific CDS view, and it was determined which fields have been requested and which WHERE-condition had to be fulfilled, then the test is built to emulate the exact same conditions for the data retrieval through the CDS view as they were during the production execution (e.g., as observed by the RDO component 363).

If the object under test does not yet exist at the customer system 350 (e.g., it is a brand new object), then basic performance tests can be generated from templates as well. As an example, all fields can be selected from a new CDS view, up to 100 entries, by default.

The test can be executed automatically by the performance test execution and analyzation (PEA) component 366 for the test version of the changed object and its production version. The runtime is measured for each execution. Multiple measurements are performed, statistical key figures are calculated automatically, such as average, standard deviation, etc. Finally, the results for both versions can be compared.

The PEA component 366 can schedule the performance test execution based on the workload of the customer system 350. For example, the tests can be configured to be performed outside of business hours such that the production processes are not disturbed due to the performance tests.

The performance measurement results are persisted in a PEA repository 367. The performance measurement results are exposed through the performance test results (PTR) API 368. These results can include the performance test results for the current product version and for the new updated version and/or information on the comparison between these two.

In some embodiments, the observation process of the RDO component 363 may take hours (or even days). Therefore, the PTR API 368 may be called through a second request, through the software manufacturer system 310 (either manually by the developer 390 or automatically, e.g., after a certain timeframe has passed).

There may also be an eventing mechanism provided by the automate performance test engine 360 to notify the developer 390 if a performance measurement request has been completely processed and results are available via the PTR API 368.

Once the results are obtained by the software manufacturer system 310, they can be analyzed by the developer 390. Depending on the results, the planned changes might be adjusted by the developer 390. If required, the overall process can be repeated, until the performance is acceptable. Afterwards, the changes can be released to production for all customers.

In some embodiments, the performance test request creation component 320 submits two or more different test version of the same object in a single request to the automated performance test engine 360. With this, the performance of different implementations can be compared at once. This is an important functionality regarding proof of concepts.

These techniques are advantageous because planned software changes are tested in the same manner as they would be used by the end users or customers, allowing for accurate and realistic performance analysis of the planned changes in comparison to the existing production version of the software. That is, instead of trying to get realistic test data from the customer to the internal test system of the software manufacturer, the tests are brought to the customer system 350 to be executed. The tests may be generated in the customer system 350 (based on information from the software manufacturer system 310), and then brought to the customer system 350 through a request from the software manufacturer system 310. The present disclosure provides multiple additional advantages. It is easier to be implemented and requires less effort on both sides (customer and software manufacturer/developer) compared to other testing techniques. Additionally, the disclosed process does not require data anonymization, etc. Furthermore, it does not require any customer action since the process is automated by the automated performance test engine 360 on the customer side.

Further details of performance test request creation by the software manufacturer system and performance test request handling by the customer system 350 are described below.

FIG. 4 shows a flowchart 400 of performance test request creation, according to an embodiment. The performance test request creation may be implemented by a software manufacturer's system such as the software manufacturer system 310 of FIG. 3.

The flowchart 400 starts at 401.

At 402, the developer changes an object. For example, the object may be a data source such as a CDS view.

At 403, the changed object is activated.

At 404, an object criticality rating (OCR) component determines criticality of the changed object.

At 405, if the object is determined to be "uncritical," then the flowchart 400 ends at 411.

At 405, if the object is determined to be "critical," then the flowchart 400 continues to 406.

At 406, an affected customer determination (ACD) component determine affected customers.

At 407, if "no customer found" then the flowchart 400 ends at 411.

At 407, if "customer found" then the flowchart continues to 408.

At 408, the system proposes automated performance testing. This testing may be proposed to the developer who may reject or approve the proposal.

At 409, if the proposal is "rejected," the flowchart 400 ends at 411.

At 409, if the proposed is "approved," the flowchart 400 continues to 410.

At 410 the system creates a performance test request and then the flowchart 400 ends at 411.

Thus, the performance test request has been created.

FIG. 5 shows a flowchart 500 of performance test request handling, according to an embodiment. The performance test request handling may be implemented by a customer system such as the customer system 350 of FIG. 3.

The flowchart 500 starts at 501.

At 502, the performance test request is received.

At 503, a changed object recorder (COR) component switches on recording for specified objects in the request.

At 504, a runtime data observer (RDO) component supervises specified objects in the request.

At 505, a runtime data observer (RDO) component protocols the consumption of the specified object. That is, the RDO records how the specified object is used (e.g., how a data source is accessed).

At 506, a performance test generation (PTG) component generates performance tests.

At 507, a performance test execution and analyzation (PEA) component executes performance tests and analyzes the results.

At 508, the results are exposed via a performance test results (PTR) API.

At 509, the flowchart 500 ends.

Accordingly, performance test request handling is performed such that the results can be accessed by the developer via the API. This is advantageous as the developer can compare the results of the production version of the software with the results of the planned changes to determine whether the planned changes are ready to be implemented at the customer system or whether the planned software changes should be adjusted or redesigned to improve performance. Furthermore, the results are accurate and realistic since they match how the customer uses their system and the results also maintain privacy of the customer's underlying data.

Additional Example Embodiments

Some embodiments provide a computer system, comprising one or more processors and one or more machine-readable medium coupled to the one or more processors. The one or more machine-readable medium storing computer program code comprising sets of instructions. The set of instructions executable by the one or more processors to obtain one or more code changes for a software application, the one or more changes including a change to a data source, a current version of the software application being run on a separate production system. The set of instructions executable by the one or more processors to provide, to the production system, a test version of the software application and test information, the test version including the one or more code change, the test information including a request to test the data source. The set of instructions executable by the one or more processors to receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The set of instructions executable by the one or more processors to adjust the one or more code changes based on the test results and performance indicators to obtain a new version of the software application. The set of instructions executable by the one or more processors to deploy the new version of the software application to the production system, the new version of the software application meeting the performance indicators.

In some embodiments of the computer system, the computer program code further comprises sets of instructions executable by the one or more processors to determine that the change to the data source is performance critical based on which fields and tables are being accessed and how many fields and tables are being accessed.

In some embodiments of the computer system, the computer program code further comprises sets of instructions executable by the one or more processors to determine that the production system is affected by the change to the data source based on identification of application components deployed to the production system.

In some embodiments of the computer system, the recording of how the data source were accessed during operation of the production system includes recording selection criteria.

In some embodiments of the computer system, the test information further includes a specified timeframe or a specified number of calls to the data source to be recorded.

In some embodiments of the computer system, the reception of the test results from the production system includes making a request to an application programming interface of the production system.

In some embodiments of the computer system, the data source is a core data services (CDS) view.

Some embodiments provide a non-transitory computer-readable medium storing computer program code. The computer program code comprising sets of instructions to obtain one or more code changes for a software application, the one or more changes including a change to a data source, a current version of the software application being run on a separate production system. The computer program code comprising sets of instructions to provide, to the production system, a test version of the software application and test information, the test version including the one or more code change, the test information including a request to test the data source. The computer program code comprising sets of instructions to receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The computer program code comprising sets of instructions to adjust the one or more code changes based on the test results and performance indicators to obtain a new version of the software application. The computer program code comprising sets of instructions to deploy the new version of the software application to the production system, the new version of the software application meeting the performance indicators.

In some embodiments of the non-transitory computer-readable, the computer program code further comprises sets of instructions to determine that the change to the data source is performance critical based on which fields and tables are being accessed and how many fields and tables are being accessed.

In some embodiments of the non-transitory computer-readable, the computer program code further comprises sets of instructions to determine that the production system is affected by the change to the data source based on identification of application components deployed to the production system.

In some embodiments of the non-transitory computer-readable, the recording of how the data source were accessed during operation of the production system includes recording selection criteria.

In some embodiments of the non-transitory computer-readable, the test information further includes a specified timeframe or a specified number of calls to the data source to be recorded.

In some embodiments of the non-transitory computer-readable, the reception of the test results from the production system includes making a request to an application programming interface of the production system.

In some embodiments of the non-transitory computer-readable, the data source is a core data services (CDS) view.

Some embodiments provide a computer-implemented method. The method comprises obtaining one or more code changes for a software application, the one or more changes including a change to a data source, a current version of the software application being run on a separate production system. The method comprises providing, to the production system, a test version of the software application and test information, the test version including the one or more code change, the test information including a request to test the data source. The method comprises receiving, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system. The method comprises adjusting the one or more code changes based on the test results and performance indicators to obtain a new version of the software application. The method comprises deploying the new version of the software application to the production system, the new version of the software application meeting the performance indicators.

In some embodiments of the computer-implemented method, it further comprises determining that the change to the data source is performance critical based on which fields and tables are being accessed and how many fields and tables are being accessed.

In some embodiments of the computer-implemented method, it further comprises determining that the production system is affected by the change to the data source based on identification of application components deployed to the production system.

In some embodiments of the computer-implemented method, the recording of how the data source were accessed during operation of the production system includes recording selection criteria.

In some embodiments of the computer-implemented method, the test information further includes a specified timeframe or a specified number of calls to the data source to be recorded.

In some embodiments of the computer-implemented method, the reception of the test results from the production system includes making a request to an application programming interface of the production system, and wherein the data source is a core data services (CDS) view.

Example Hardware

Figure 6:
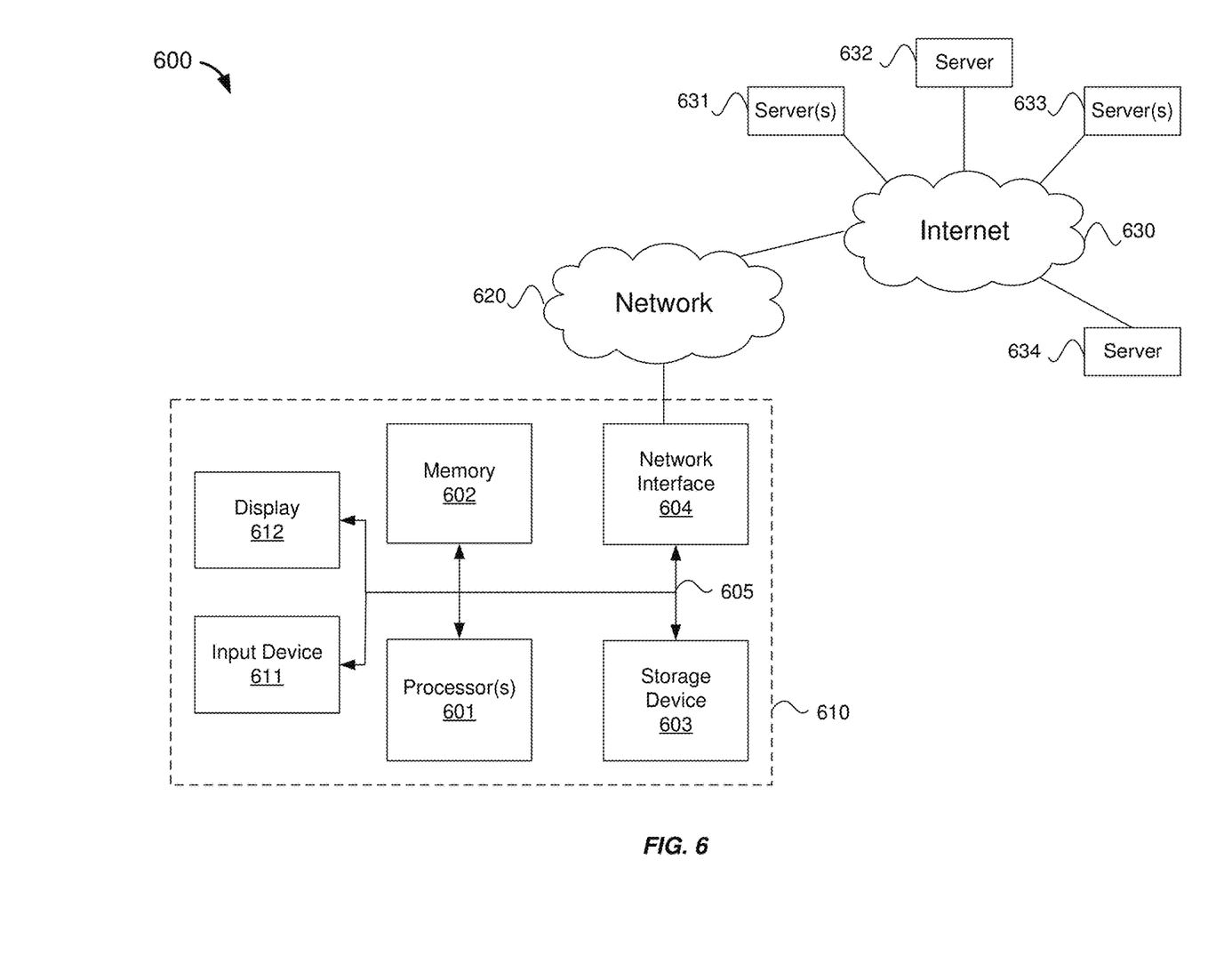
FIG. 6 shows a diagram of hardware of a special purpose computing machine for implementing systems and methods described herein.

FIG. 6 shows a diagram 600 of hardware of a special purpose computing machine for implementing systems and methods described herein. The following hardware description is merely one example. It is to be understood that a variety of computer systems and environments may be used to implement the above described techniques. For instance, the computer system may implement the computer implemented method described.

An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory 602 may also be used for storing programs executed by processor(s) 601. Possible implementations of this memory may be, but are not limited to, random access memory (RAM), read only memory (ROM), or both. As such, the memory 602 is a non-transitory computer readable storage medium.

A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums. For example, the storage device 603 may store computer program code including instructions for implementing the method described above with respect to FIG. 2.

Computer system 610 may be coupled using bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers 631, 632, 633, 634 across the network. The servers 631-634 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions executable by the one or more processors to:
   obtain one or more code changes for a software application, the one or more changes including a change to a data source, a current version of the software application being run on a separate production system;
   provide, to the production system, a test version of the software application and test information, the test version including the one or more code change, the test information including a request to test the data source;
   receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system;
   adjust the one or more code changes based on the test results and performance indicators to obtain a new version of the software application; and
   deploy the new version of the software application to the production system, the new version of the software application meeting the performance indicators.

2. The computer system of claim 1, wherein the computer program code further comprises sets of instructions executable by the one or more processors to:
   determine that the change to the data source is performance critical based on which fields and tables are being accessed and how many fields and tables are being accessed.

3. The computer system of claim 1, wherein the computer program code further comprises sets of instructions executable by the one or more processors to:
   determine that the production system is affected by the change to the data source based on identification of application components deployed to the production system.

4. The computer system of claim 1, wherein the recording of how the data source were accessed during operation of the production system includes recording selection criteria.

5. The computer system of claim 1, wherein the test information further includes a specified timeframe or a specified number of calls to the data source to be recorded.

6. The computer system of claim 1, wherein the reception of the test results from the production system includes making a request to an application programming interface of the production system.

7. The computer system of claim 1, wherein the data source is a core data services (CDS) view.

8. A non-transitory computer-readable medium storing computer program code comprising sets of instructions to:
   obtain one or more code changes for a software application, the one or more changes including a change to a data source, a current version of the software application being run on a separate production system;
   provide, to the production system, a test version of the software application and test information, the test version including the one or more code change, the test information including a request to test the data source;
   receive, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system;
   adjust the one or more code changes based on the test results and performance indicators to obtain a new version of the software application; and
   deploy the new version of the software application to the production system, the new version of the software application meeting the performance indicators.

9. The non-transitory computer-readable medium of claim 8, wherein the computer program code further comprises sets of instructions to:
   determine that the change to the data source is performance critical based on which fields and tables are being accessed and how many fields and tables are being accessed.

10. The non-transitory computer-readable medium of claim 8, wherein the computer program code further comprises sets of instructions to:
    determine that the production system is affected by the change to the data source based on identification of application components deployed to the production system.

11. The non-transitory computer-readable medium of claim 8, wherein the recording of how the data source were accessed during operation of the production system includes recording selection criteria.

12. The non-transitory computer-readable medium of claim 8, wherein the test information further includes a specified timeframe or a specified number of calls to the data source to be recorded.

13. The non-transitory computer-readable medium of claim 8, wherein the reception of the test results from the production system includes making a request to an application programming interface of the production system.

14. The non-transitory computer-readable medium of claim 8, wherein the data source is a core data services (CDS) view.

15. A computer-implemented method, comprising:
obtaining one or more code changes for a software application, the one or more changes including a change to a data source, a current version of the software application being run on a separate production system;
providing, to the production system, a test version of the software application and test information, the test version including the one or more code change, the test information including a request to test the data source;
receiving, from the production system, test results comparing performance of the data source in the current version of the software application to performance of the data source in the test version of the software application, the test results obtained by supervising the data source, recording how the data source was accessed during operation of the production system, and testing performance of the change to the data source in test version of the software application by accessing the test version data source in a same manner as it was accessed during the operation of the production system;
adjusting the one or more code changes based on the test results and performance indicators to obtain a new version of the software application; and
deploying the new version of the software application to the production system, the new version of the software application meeting the performance indicators.

16. The computer-implemented method of claim 15, further comprising:
determining that the change to the data source is performance critical based on which fields and tables are being accessed and how many fields and tables are being accessed.

17. The computer-implemented method of claim 15, further comprising:
determining that the production system is affected by the change to the data source based on identification of application components deployed to the production system.

18. The computer-implemented method of claim 15, wherein the recording of how the data source were accessed during operation of the production system includes recording selection criteria.

19. The computer-implemented method of claim 15, wherein the test information further includes a specified timeframe or a specified number of calls to the data source to be recorded.

20. The computer-implemented method of claim 15, wherein the reception of the test results from the production system includes making a request to an application programming interface of the production system, and wherein the data source is a core data services (CDS) view.

* * * * *